March 27, 1956     W. H. VOGELSBERG     2,740,015
CONTROL APPARATUS FOR ELECTRICAL HEATING UNITS
Original Filed April 25, 1950     6 Sheets-Sheet 1

FIG. 1. (OFF POSITION)

FIG. 2. (FLASH - HIGH HEAT.)

FIG. 3. (RUN - HIGH HEAT.)

Inventor:
Walter H. Vogelsberg
by his Attorneys
Howson & Howson

March 27, 1956     W. H. VOGELSBERG     2,740,015
CONTROL APPARATUS FOR ELECTRICAL HEATING UNITS
Original Filed April 25, 1950     6 Sheets-Sheet 2

Inventor:
Walter H. Vogelsberg
by his Attorneys
Howson & Howson

March 27, 1956  W. H. VOGELSBERG  2,740,015
CONTROL APPARATUS FOR ELECTRICAL HEATING UNITS
Original Filed April 25, 1950  6 Sheets-Sheet 3

March 27, 1956     W. H. VOGELSBERG     2,740,015
CONTROL APPARATUS FOR ELECTRICAL HEATING UNITS
Original Filed April 25, 1950     6 Sheets-Sheet 4

Inventor:
Walter H. Vogelsberg
by his Attorneys
Howson & Howson

March 27, 1956     W. H. VOGELSBERG     2,740,015
CONTROL APPARATUS FOR ELECTRICAL HEATING UNITS
Original Filed April 25, 1950     6 Sheets-Sheet 5

United States Patent Office 2,740,015
Patented Mar. 27, 1956

2,740,015
CONTROL APPARATUS FOR ELECTRICAL HEATING UNITS

Walter H. Vogelsberg, Glen Burnie, Md., assignor to Proctor Electric Company, Philadelphia, Pa., a corporation of Pennsylvania Original application April 25, 1950, Serial No. 157,933, now Patent No. 2,666,124, dated January 12, 1954. Divided and this application February 2, 1953, Serial No. 343,687

7 Claims. (Cl. 200—116)

This invention relates to control devices for electric ranges. More particularly, the invention relates to devices by which an electric range heating unit may be "flashed" to a selected temperature, and said heating unit may then be caused to operate under normal energization at an average rate of energization dependent upon the control setting. By the "flashing" of an electric heating unit is meant overenergization of the unit to cause a rapid rise of temperature thereof to the selected temperature.

This application is a division of my copending application Serial No. 157,933, filed April 25, 1950, now Patent No. 2,666,124, issued January 12, 1954, which claims the system in which the switch device claimed herein may be used.

The flashing of an electric heating unit to a selected temperature is broadly disclosed and claimed in Patent No. 2,210,947, issued August 13, 1940, to J. W. Myers et al. Reference may be had to that patent for the broad principles underlying the present invention. Further, in my copending applications Serial No. 81,936, filed March 17, 1949, and Serial No. 87,462, filed April 14, 1949, now Patent Nos. 2,648,755 and 2,648,756, issued August 11, 1953, specific types of control systems and switch structure are disclosed.

The present invention, although utilizing some of the teachings shown of these prior disclosures, contemplates as its main object the provision of a novel switch structure.

More specifically an object of the present invention is the provision of a novel switch structure featuring compactness, optimum utilization of available space, economy of parts, interchangeability of parts wherever possible, and optimum arrangement of parts for electrical bus simplification.

Another object provides for replacing several of the switch members of the prior circuit arrangements with an automatically controlled switch structure thus effecting a saving in switch parts and space and a simplification in mechanical design.

A further object of one form of this invention is to adapt to the flasher circuit and corresponding switch structure an arrangement for obtaining 100% input level after termination of the flash interval by connecting the electric heating unit directly across the supply line instead of through the main control contacts which normally control, by cyclic opening and closing, the average wattage at the lower heat levels.

As will be brought out in the detailed description, the advantages of this improvement and the particular mode of instituting it include insuring full input for the high position regardless of wear on the contact surfaces, and permitting greater freedom in the design of a wattage controller which must also control the length of the flash interval.

The advantages of this improvement and the particular mode of instituting it will be brought out in the detailed description.

Other objects and features of the invention will also be apparent from the following detailed description with reference to the accompanying drawings wherein.

GENERAL

Figure 1:
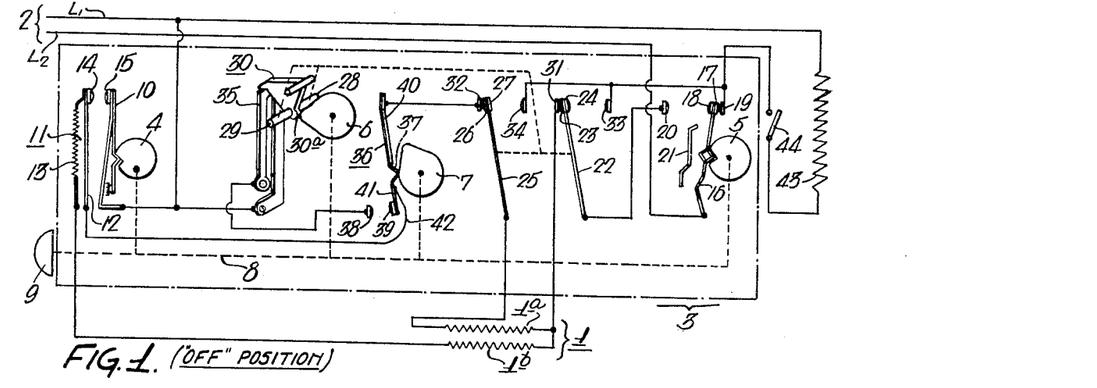
Fig. 1 is a schematic view of the control switch in circuit with an electric range heating unit, the contact blades of the control device being shown in the "off" position.

An understanding of the control switch and the novel features involved therein can best be had by first referring to the schematic diagrams of the circuit shown in Figs. 1 to 5. Fig. 1 shows a heating unit 1, more particularly a surface unit for an electric range, having two sections 1a and 1b connected to a supply line 2 through the control switch which is shown in phantom and is given the general designation 3. The control device includes a plurality of control cam members 4 to 7 which are shown as separate cams connected to a common control shaft 8 and operable through a single control knob 9. However, as will be indicated in the preferred structural embodiment, the camming function can be advantageously performed by a plurality of camming surfaces on a single face cam.

Cam 4 manipulates a continuously adjustable blade 10 between an "off" position and any one of a plurality of "on" positions and in so doing controls the position of a thermomotive member 11. This member comprises a bimetallic element 12 with a heater strip 13 fixed to the free end thereof and having a contact 14 also fixed thereto so that it may cooperate with a contact 15 on the free end of adjustable blade 10.

Cam 5 operates a switch blade 16, having contacts 17 and 18 fixed thereto, between an "off" position where it engages stationary contact 19 and an "on" position where it engages another stationary contact 20 and the free end of a flexible blade 21 which serves to energize a signal light (not shown) for indicating when the heating unit is energized. The electrical connection to the other side of the signal light is the neutral or common wire of the supply line (not shown).

Blade 22 and attached contacts 23 and 24 and a second blade 25 with its attached contacts 26 and 27 are also included in the control device and are movable in unison through extending arms 28 and 29 of a latch member 30 from a first position, which may be designated as the "flash position" wherein engagement is made with stationary contacts 31 and 32, to a second position which may be designated as the "normal" or "run" position wherein engagement is made with stationary contacts 33 and 34. The latch member 30 is provided with a surface 30a for engagement by cam 6 for manipulating said member and blades 22 and 25 controlled thereby into "flash" position (and for maintenance therein) when the control knob is turned to the "off" position. Manipulation of the latch member also permits a U-shaped prop 35 to fall into a propping position when the switch is turned to the "off" position. The prop 35 acts to hold the blades 22 and 25 in their "flash" position when the cam 6 is moved out of the way of the surface 30a on the latch 30. The prop 35 is a self-heating bimetallic member and is adapted to flex at its upper end out of the way of the latch 30 at the termination of the "flash" interval, permitting the blades 22 and 25 to move under their own bias to the position for "normal" or "run" operation.

The fourth control cam 7 is provided to coact with a switch member 36 through an extension 37 thereon. The switch member is normally biased away from a stationary contact 38, and cam 7 is arranged to force a contact 39 mounted at the end of switch member 36 into engagement with this stationary contact when the control knob 9 is set into position for "high" heat. The switch member 36 includes a bimetallic root portion 40 and an inactive portion 41 of which extension 37 is a part. A flexible lead 42 is connected from the bimetallic portion 40 to the base of the bimetal 12 at the thermomotive member 11. The switch member 36, under a desired heat other than "full" or "high," is arranged to flex at the beginning of a flash cycle by a self-heating effect so as to establish connection with stationary contact 38, thereby connecting the prop member 35 in parallel across the control contacts 14 and 15. After flash termination, the active portion 40 cools, thus separating contacts 38 and 39.

Off position—Fig. 1

In the off position of the control switch as shown in Fig. 1, it should be noted that the heating unit 1 is fully disconnected from both sides $L_1$, $L_2$ of supply line 2. Thus contacts 14 and 15 and contacts 38 and 39 are separated to disconnect one side of section $1b$; contact 33 and blade 22 and contact 20 and blade 16 are separated to disconnect the mid-tap of the two sections $1a$ and $1b$; and further, contact 34 and blade 25 and contacts 38 and 39 are separated to disconnect the other end of section $1b$.

It should be noted that during "off" conditioning of the switch, continuity of circuit is provided to any additional loads like an oven circuit, designated by a resistor 43 and a switch 44. The circuit can be traced through $L_2$ of the supply line, blade 16, contact 19 to the oven load 43 and back to line $L_1$.

Figure 2:
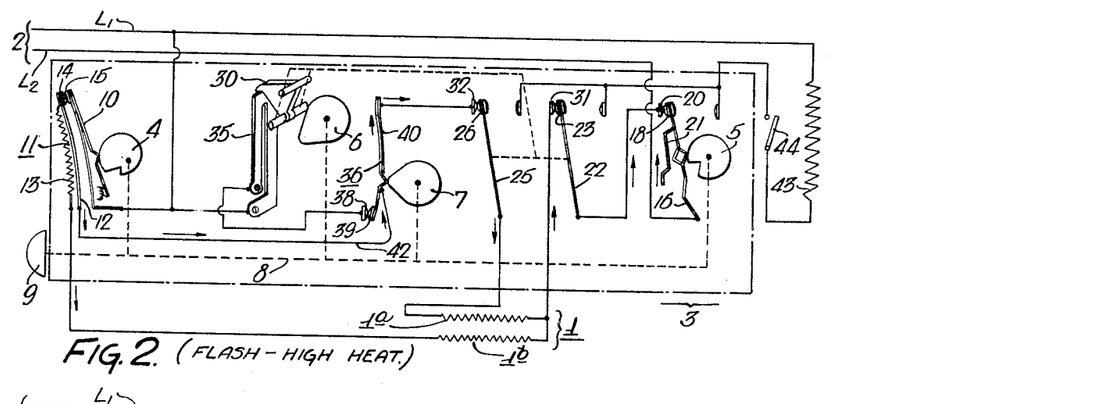
Fig. 2 shows the contact blades of the control switch of Fig. 1 in the "flash" position, the control knob being in the "high" heat position.
Figure 3:
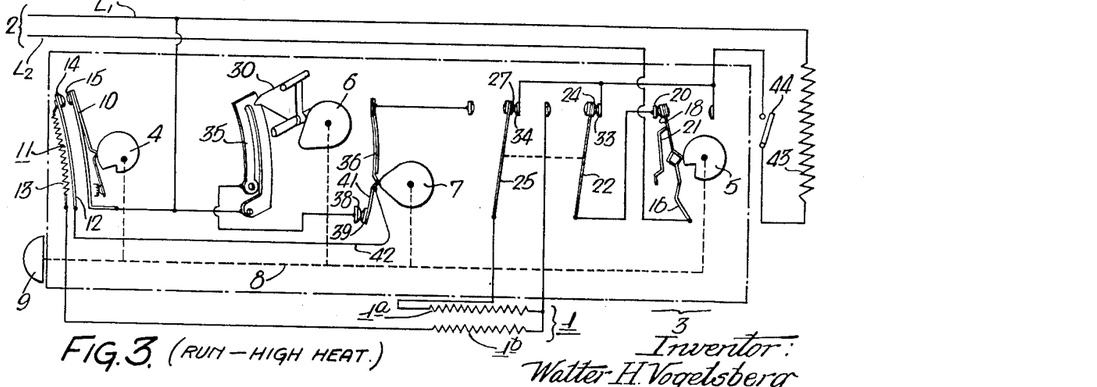
Fig. 3 shows the contact blades of the control device of Fig. 1 in the normal or "run" position at the "high" heat positioning of the control knob.

High heat or 100% input—Figs. 2 and 3

When the control knob is rotated to the high heat or 100% input position, the sections $1a$ and $1b$ of the heating unit are arranged in parallel across the supply line $L_1$, $L_2$, and after a timed interval of overenergization as controlled by the thermomotive member 11 these sections are arranged in series across the supply line at full rated wattage for the particular heating unit.

The mechanical manipulation effected by rotation of the control knob 9 to the high heat position includes the moving of blade 16 into engagement with contact 20 and simultaneous energization of a signal or pilot lamp by contact with blade 21; the imparting of a maximum displacement to blade 10 so as to require the greatest possible deflection at the thermostat 11 before separation of contacts 14 and 15 could occur; a movement of switch member 36 into engagement with contact 38; and finally the removal of cam 6 from the latch member 30 so as to remove the physical restraint provided thereby and thus allow free movement thereof. The circuit can be traced in Fig. 2 from $L_1$, through the adjustable blade 10, contacts 15 and 14, thence through the first of the parallel branches comprising the control bimetal 12, the flexible connection 42, the active portion 40 of switch member 36, contact 32, blade 25 and section $1a$ and the second branch comprising the heater 13 and the section $1b$; the total current then flows through contact 31, contact blade 22, contact 20, blade 16 and thence to $L_2$.

Due to the fact that the contacts 14 and 15 are closed, there is insufficient current flow through the bimetallic prop 35 to cause perceptible self-heating thereof. The reason for this is that the contacts 14 and 15 and the flexible lead 42 effectively short circuit the prop 35. The current through the switch member 36 causes flexure of said switch toward contact closing position, but in this particular control switch position such self-flexing is not relied on for closure of contacts 38 and 39.

The period of overenergization causes rapid heating of the heating unit 1, supplying four times the normal energization rate for the particular heating unit. This of course applies to heating units having sections of substantially equal resistances. A situation in which the sections of the heating unit do not have equal resistance is discussed at length in my copending application, Serial No. 109,083, filed August 8, 1949, now Patent No. 2,569,121, issued September 25, 1951. This latter type of application is within the scope of the present invention.

The length of this flash interval at the "high" heat depends on the mass and dissipation factors of the heating unit being used and for certain conventional types has been found to require approximately .6 minute. The thermomotive member 11 is designed so that it is in effect a prototype of the heating unit being controlled. This phenomenon has been dealt with at length in the prior art as "the history heater effect." This effect not only controls the length of time for flash on first cycle, that is, starting from cold, but controls the length of flash on repeated turning off and on of the heating unit. Reference may be made to my Patent No. 2,648,755, issued August 11, 1953, and to Patent No. 2,207,634, issued July 9, 1940 to J. W. Myers et al. for a more complete discussion.

When the heating unit attains a temperature substantially equal to the desired operating temperature, the thermomotive member 11, heated by heater 13 at a rate proportional to the heating of the heating unit, effects opening of contacts 14 and 15 thereby passing full flash current through the shunt circuit which includes the bimetal prop 35 and contacts 38 and 39. Through self-heating of the bimetal prop, the latch member 30 is released (Fig. 3) and blades 22 and 25 move into engagement with contacts 33 and 34, respectively, to effect normal energization of the heating unit.

The circuit connections are now such as to place the heating unit sections in series across the supply line. They can be traced as follows in Fig. 3: $L_1$, through bimetal prop 35 through contacts 38 and 39 of the switch member, through the rigid extension 41, flexible connection 42, through control bimetal 12, heater 13, heating unit sections $1a$ and $1b$, through blade 25, contact 34, contact 33, blade 22, contact 20, blade 16 and thence to line $L_2$. Continuity of load is provided to the oven circuit from $L_2$, through blade 16, contact 20, blade 22, contacts 33, and thence through load 43 to line $L_1$.

It should be noted that during "run" the thermomotive member 11 receives sufficient heat from current passing therethrough to maintain the contacts 14 and 15 separated, that these contacts are not relied upon for maintenance of 100% energization, and that the bimetal prop 35 is heated continuously by the full current flowing through the heating unit. Each of these factors has special significance and will be discussed more fully hereinafter.

Figure 4:
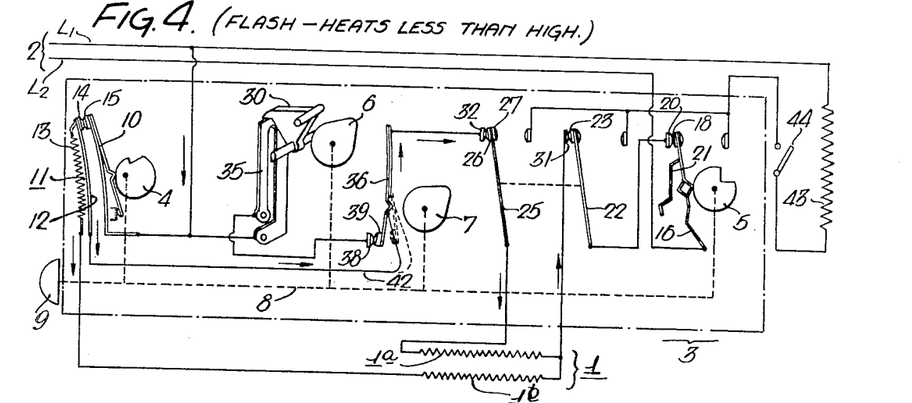
Figs. 4 and 5 are similar to Figs. 2 and 3 respectively, with the control knob in a position other than at "high" heat.
Figure 5:
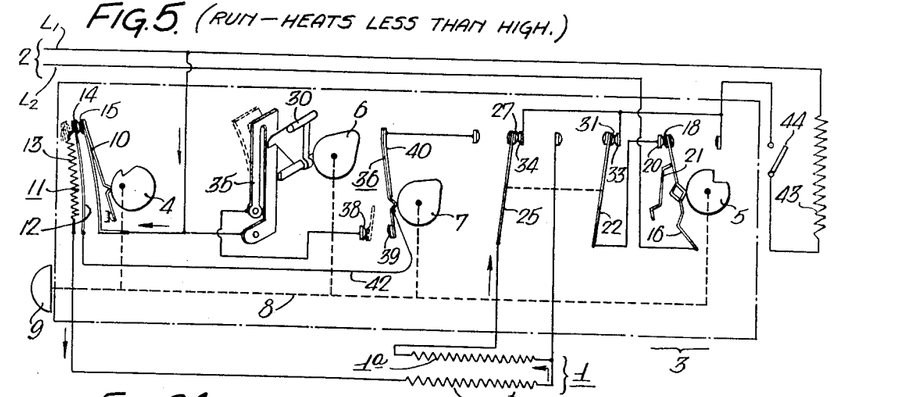

*Heats less than "High"—Figs. 4 and 5*

Manipulation of the control knob 9 to a position which calls for less than the 100% input, commonly termed the "medium high," "medium," "low," and "simmer" heats or equivalent, effects engagement of contacts 18 and 20, energization of the signal light, removal of restraints from the latch member 30, and the setting of the adjustable blade 10 and thermomotive member 11 according to the particular heat desired. The manipulations are therefore the same as with the high heat selection except that cam 7 does not effect mechanical closure of contact 38 and contact 39 on switch member 36. Circuit connections (Fig. 4) effected by this manipulation bring about parallel connection of the heating unit sections 1a and 1b in a manner similar to that explained previously except that the bimetal prop 35 is not instantaneously thrown in shunt with the control contacts 14 and 15. Instead the current established through section 1a of the heating unit heats the active portion of the switch member 36 thereby flexing it so that engagement is made between contacts 38 and 39. It was found that a time lag of approximately 3 seconds between starting of flash and closing of said contacts was entirely satisfactory.

The length of the overenergization period is arranged to be proportionately less than that provided for the "high" heat, so that the heating unit will heat to substantially that temperature which is to be subsequently maintained. The adjustment of the blade 10 and thermomotive member 11 provided through the cam 4 simultaneously controls two factors: first, the amount of deflection that thermomotive member 11 must achieve for contacts 14 and 15 to separate and thereby terminate flash and, secondly, the average wattage necessary to supply the losses to the control bimetal 12 to maintain this deflection and thereby simultaneously control the average wattage to the heating unit connected in series therewith.

Termination of the flash cycle is brought about by passage of the flash current through the bimetal prop 35 and contacts 38 and 39 as previously described. At the end of the flash cycle (Fig. 5), there is no longer any current flowing through the bimetallic portion 40 of the switching member 36. Thus this member cools and returns to its normally biased position wherein contacts 38 and 39 are separated.

The circuit established during normal energization can be traced in Fig. 5 from line L₁ through the contacts 14 and 15, heater 13, heating unit sections 1b and 1a in series, through blade 25, contact 34, contact 33, blade 22, contact 20, blade 16 and thence through to line L₂. The circuit differs from that established during 100% input in that the current established through the heating unit travels through the control contacts 14 and 15. The thermomotive member 11 cyclically opens and closes the contacts 14 and 15 to control the average heat to the heating unit.

DETAILS OF SWITCH CONSTRUCTION

*General—Switch case, cover, detents and cam*

The structural embodiment of the control switch to be described below will be best understood by correlating the various members with their schematic equivalents in Figs. 1 to 5.

Figure 6:
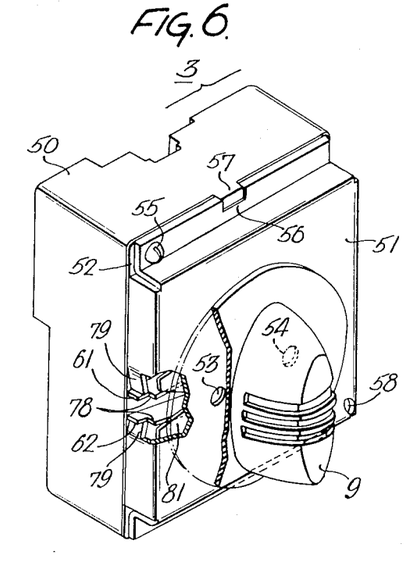
Fig. 6 is an isometric view of the assembled control switch, a portion of the cover member being cut away to show some of the detent detail.
Figure 7:
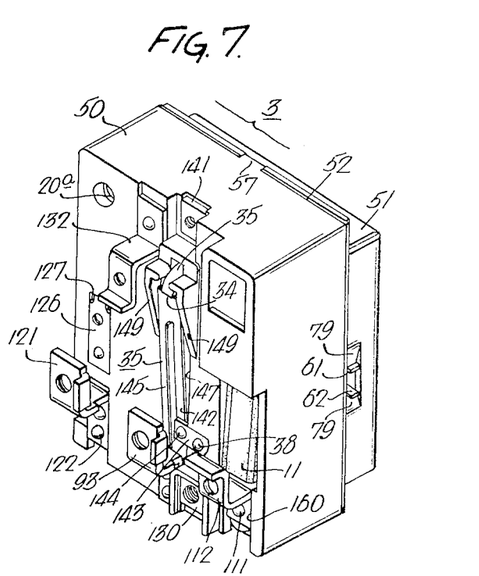
Fig. 7 is an isometric view of the rear of the control switch.
Figure 8:
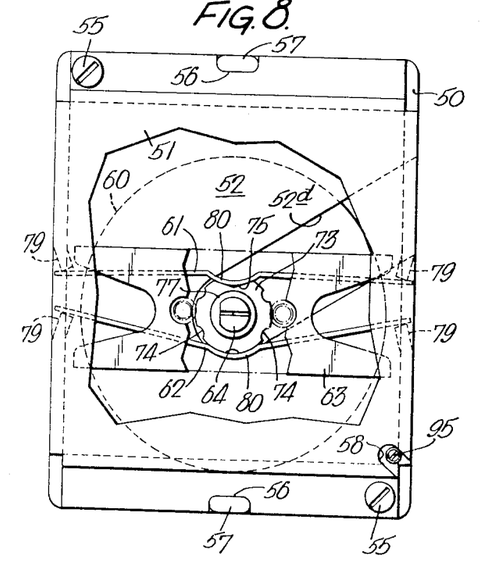
Fig. 8 is a front view of the control switch with the cover member and thrust spring partially cut away.

The control switch 3 is shown in Figs. 6 to 8 to comprise a switch case 50 molded preferably from an asbestos-filled high heat-resistance phenolic compound, a metallic cover member 51, and a control knob 9 equipped with suitable indicia so that the user may select the average heat desired for the heating unit 1. Disposed between the cover 51 and the various switch members in the switch case 50 is a barrier member 52 (see Fig. 10) made preferably of an electrical insulating material such as a linen base laminated phenolic.

In Fig. 6 which shows the control switch 3 with the control knob 9 partially cut away, the cover member 51 is shown provided with two threaded holes 53 and 54 for convenient fastening to the control panel of an electric range or the like. Screws 55 are further provided for fastening the cover 51 to the control case 50, while cutouts 56 in said cover coact with suitable projections 57 on the control case for accurately aligning the cover thereon. A hole 58 at the lower end of the cover 51 provides easy access to the zero adjustment for the members 10 and 11 as will be explained hereinafter.

Figures 11, 12, 14:
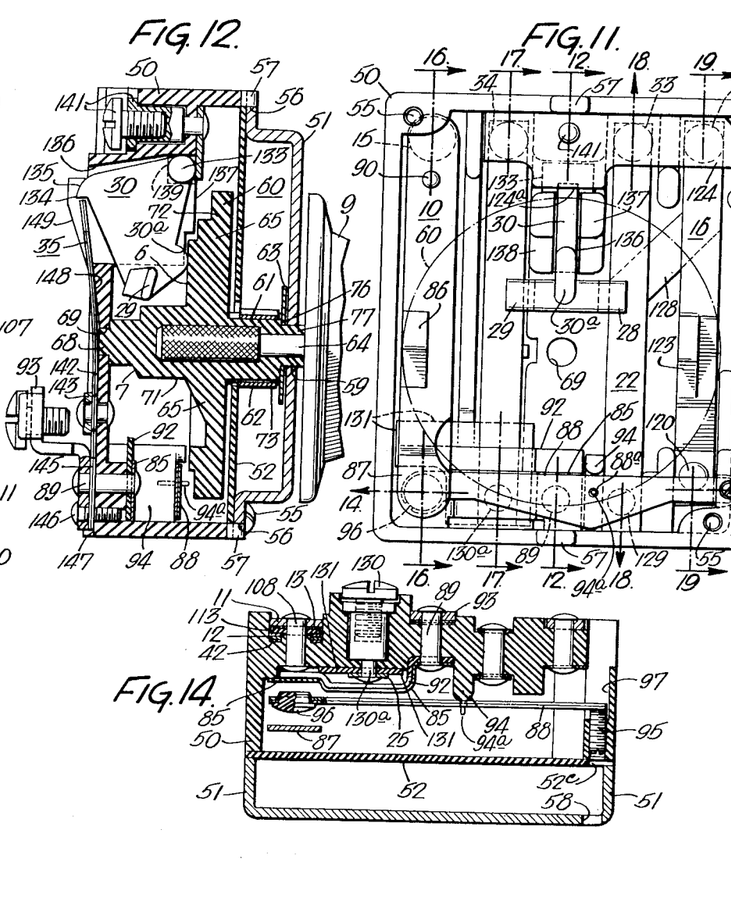
Fig. 11 is a view looking into the switch case after the cover member and cam are removed.
Fig. 12 is a sectional view through the center of the control switch along line 12—12 of Fig. 11, with the cover member in position.
Fig. 14 is a sectional view through the bottom of the control switch along line 14—14 of Fig. 11, showing the compensator blade assembly.
Figure 20:
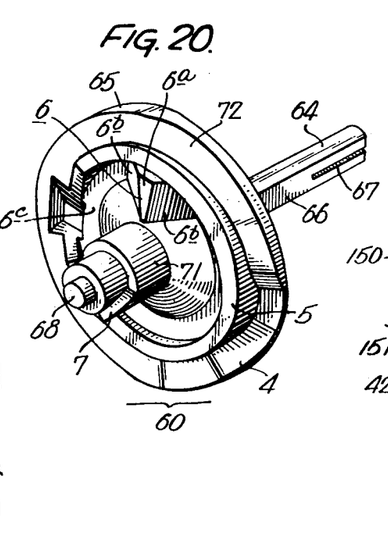
Fig. 20 is an isometric view of the control cam.

The cover member 51 forms a journal mounting at 59 (see Fig. 12) for a control cam member 60 and in addition houses detent spring members 61 and 62 and a thrust spring member 63 for holding the cam member 60 bottomed against the rear of the control case. The control cam 60 (Fig. 20) comprises a metallic shaft member 64 insert molded into a non-metallic portion 65 of phenolic condensation product similar to that used for the switch case 50. The shaft member 64 is provided with a flat portion 66 for indexing the control knob 9 into its proper position and a milled slot 67 so that the control knob may be friction-held against longitudinal movement along the shaft. The molded portion 65 (starting at its lower end) is shown in Figs. 12 and 20 to include a pilot portion 68 which is received in a hole 69 in the switch case, a camming race 7 disposed near the plane of the rear of the switch case, a cylindrical portion 71, a disc-like portion 72 having camming races 4, 5 and 6 disposed as concentric rings on one face thereof, a second cylindrical portion 73 having a plurality of small detents 74 and a single larger detent 75 (Fig. 8), a shoulder portion 76, and a journal area 77.

The detent springs 61 and 62 which cooperate with detents 74 and 75 are identical spring steel members having cut-out end portions 78 for coacting with lanced portions 79 (Fig. 6) on the sides of the cover member and arcuate central portions 80 placed facing in the same direction to get the proper detent action. Detent spring 61 effects a soft detenting action when coacting with detents 74 and a heavy detent action at a position corresponding to "off" is had by coacting with detent 75. The other detent spring 62 is placed so that the arcuate portion nestles over the outer diameter of the cylindrical portion 73. Thus it does not specifically add to the detent action except for some frictional effect but instead acts to counterbalance some of the large impact forces exerted on the metallic bearing 59 and non-metallic journal 77 during rotation of the control knob. It should be mentioned that the detent springs before insertion in the switch cover are substantially flat members. Also it should be observed that these springs have their ends spaced at different distances from the center line of the shaft. The arrangement is such that the force exerted by spring 62 is approximately the mean between the maximum and minimum forces exerted by spring 61 when going from the smaller detent 74 to the larger detent 75 positions. The soft detent positions correspond respectively to a "high" heat at 100% input and to approximately 50% input for a medium "high" heat, 37% input for a "medium" heat, 20% input for a "low" heat, and 8% input for a "simmer" heat. Of course intermediate positions are available, for the soft detents do not prevent the control knob from being placed at an angular position between the detenting grooves.

Figure 9:
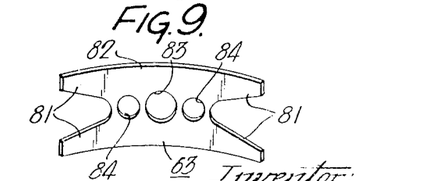
Fig. 9 is a view of the thrust spring.

The thrust spring 63 is placed between the cover and the detent springs 61, 62 having foot portions 81 (see Fig. 9) which bear against the inside face of the cover and a central face 82 which bears against the shoulder portion 76 of the control cam. Hole 83 is a clearance hole for the shaft 64 while holes 84 provide clearance for the screws (not shown) used for mounting the control switch 3 to an electric range.

Figure 10:
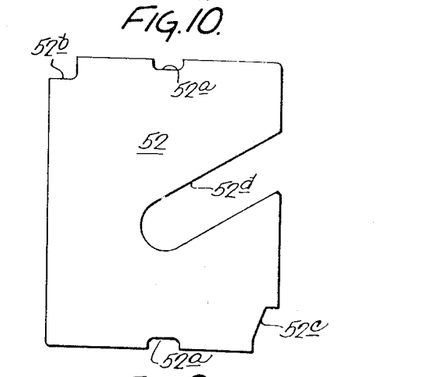
Fig. 10 shows the details of the barrier member.

The barrier member 52 as shown in Fig. 10 shields the switch members from the metallic cover member 51 and detent springs 61 and 62. It is, however, provided with clearance cutouts 52a, 52b and 52c to accommodate the projections 57, the screw fastenings 55 and the screw fastening and zero adjustment aperture. A large cutout at 52d permits assembly of the barrier around the cylindrical portion 73 of cam 60 without removal of the cam from the cover member 51.

With the cover member 51 barrier member 52, and cam 60 removed from the control case 50 (Fig. 11) the various switch members or portions thereof which are at least in part controlled by the control cam surfaces are shown disposed in four compartments in said control case. The outermost cam surface 4 which possesses the longest annular path on the disc-like section 72 is preferably used to manipulate the adjustable blade 10 and thermomotive member 11 disposed at the extreme left of the switch. Blade 16 (generally referred to as the "on-off" blade) is disposed on the opposite side of the switch and is actuated by the next cam race 5. The third cam race 6 manipulates the latch member 30 mounted directly above the center of the switch and so controls the position of blades 22 and 25 disposed on each side of the switch center. Below blade 25 (Figs. 17 and 23) in the same compartment therewith is the switch member 36 having its extensions 37 for actuation by the last control cam race 7. It should be noted that the switch blades are normally biased outward toward the actuating surface of the cam. Thus the positioning of the switch blades depends on the longitudinal positioning of said surfaces with respect to some datum on the switch case with which they are maintained in unvarying relationship by the thrust spring arrangement 63 mentioned hereinbefore.

*Adjustable blade and thermomotive member*

The thermostatic switch constituted by thermostat 11 and adjustable blade 10 is the subject of my Patent No. 2,623,137 issued December 23, 1952. Sufficient description thereof will be given here for the purpose of this invention.

Figure 16:
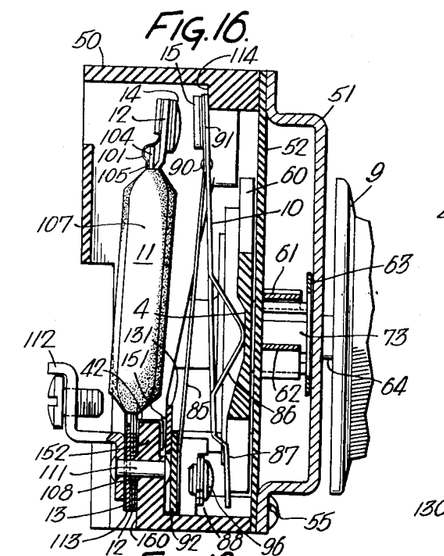
Figs. 16 to 19 are sectional views through the control switch along the lines indicated in Fig. 11.

As shown in Fig. 16, the continuously adjustable blade 10 is supported at the end of a flexible mounting member 85, and the thermomotive member 11 is fixed to the outside rear of the control case. The blade 10 is a rather heavy metallic member having a lanced portion 86 for coaction with the control surface 4 of control cam 60 and an offset portion 87 for engagement with a compensator element 88 disposed across the bottom of the control case 50. The flexible mounting member 85 is preferably of silicon copper alloy, being formed as a generally L-shaped member and having one end fixed at the center of the switch by means of a rivet member 89 (Fig. 12) while the free end is both riveted at 90 and welded between contact 15 and the top end of blade 10 at 91. The rivet member 89 extends through the switch case holding a barrier member 92, formed preferably from a fabric base laminated phenolic, against the inside rear of the switch case, beneath the flexible mounting member 85 and connects on the outside rear of the switch case to a terminal member 93.

The compensator 88, as shown in Figs. 11 and 14, is of bimetallic material being placed into position with its high expansion facing toward the rear of the switch case. This bimetallic member spans the width of the control case, being fulcrumed on a projection 94 and coacting with the blade 10 at one end and bearing against adjustment screw 95 at its opposite end. The end adjacent control blade 10 is bifurcated to receive an insulating button 96 which serves to isolate the blade thermally and electrically from said blade. The opposite end is reduced in width to fit into an aperture 97 in the control case where it engages the screw 95 which is accessible from the outside of the switch through hole 58 in the cover member 51. A pin 94a in the fulcrum 94 is received in a hole 88a in the compensator to prevent lateral motion thereof across the control box 50.

Figure 22:
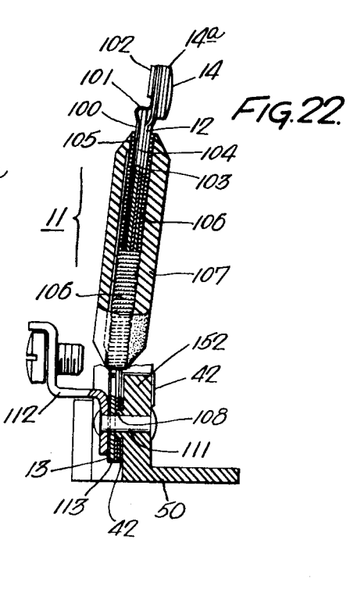
Fig. 22 is a cutaway section of the thermomotive member.

Referring now to Figs. 16 and 22 the thermomotive member 11 is shown to consist of a substantially straight control bimetal 12 and a heater element 13 of high temperature material such as a nickel chrome alloy having a narrow section 100 which extends a greater portion of its length and an offset section 101 of substantial width. The bimetal 12, the heater element 13, and the electrical contact 14 are welded together using a steel button 102 and a steel backing 14a on the contact 14 to facilitate the welding. Disposed between the heater element 13 and bimetal 12 is an insulating medium 103 comprising a strip of asbestos 104 and a thin layer of mica 105 adjacent the heater element. The strip of asbestos 104 is of substantially greater thickness than the mica strip 105, providing the greater part of the heat storage and heat transmitting functions; the mica strip provides a hard smooth surface to facilitate any relative movement between the heater element and the insulating medium during the cyclic heating and cooling of the thermomotive member 11. A wrapping 106 of glass cord is placed around the heater 13, the insulating medium 103, and bimetal 12 to hold these members in fixed spaced relation.

A sleeve 107 made of heat resistant rubber is placed over the assembly of heater, bimetal, insulating medium and glass cord wrapping chiefly to control the overall heat storage capacity of the thermomotive member.

The assembly of the thermomotive member onto the control case 50 is also shown in Figs. 16 and 22. A projection 108 formed on the control case 50 has an outer diameter of such dimension as to accurately receive the control bimetal 12 through a hole provided therein. Concentrically disposed in said projection is a hole to receive a rivet 111 which is provided for holding a terminal member 112, the lower part of the heater 13, an insulator strip 113, the bimetal 12, and an end of the thin flexible connector 42 onto the control case. The insulator strip 113 provides a preset and constant separation between the roots of the heater strip and the control bimetal and in addition acts to electrically insulate one from the other. It will be noted that the insulator strip 92 is interposed between the head of the rivet 111 and the mounting member 85 to isolate these control members electrically from one another, and further that the thermomotive member 11 is prevented from sideward movement by being placed in a recess 160 formed in the rear of the switch case.

Figure 21:
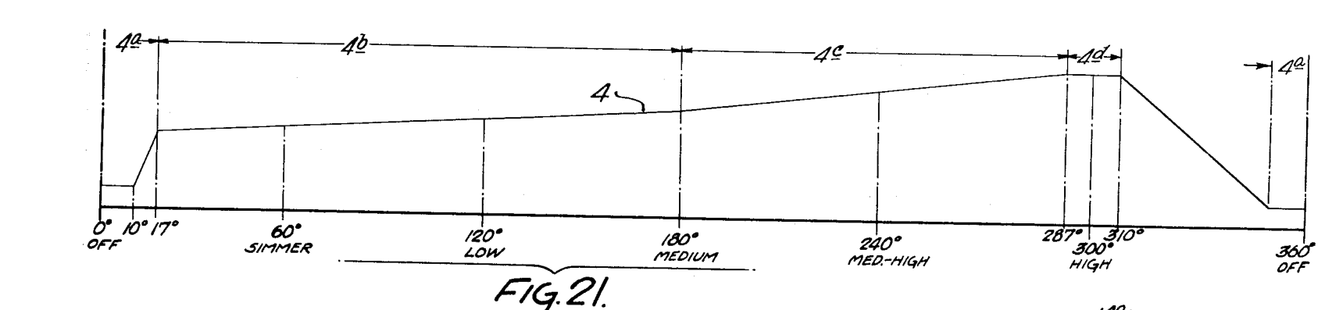
Fig. 21 is a development of the program on the control cam race which governs the wattage inputs and flash intervals.

It should be noted that the adjustable blade 10 and thermomotive member 11 are preferably placed in one of the compartments adjacent the side of the switch, and that the blade cooperates with the control cam surface that has the longest annular path. These factors contribute toward nicety and accuracy of control which result from the possibility of using a low deflection rate per degree of angular rotation of the control knob. Fig. 21 shows the program on cam surface 4. Section 4a corresponds to the "off" position of the switch wherein the flexible mounting blade 85 biases the blade 10 so that its lanced portion 86 rests therein, and its upper portion bears against an abutment 114 in the control case, thus providing a substantial clearance between contacts 14 and 15 (see Fig. 16). Section 4b is shown with a uniform rate of rise and includes the "simmer," and "medium" heats; section 4c has a steeper rate of rise, the "medium high" heat position being located approximately midway up the slope. In this particular embodiment, the slope provided in section 4b has a rate of .009″ in 60° of cam rotation, while that for section 4c has a rate of .028" in 60° of cam rotation. The "high" heat position is on a straight plane surface 4d at the top of slope 4c. When the control knob is moved to an "on" position, the top of blade 10 is forced away from abutment 114 and into engagement with contact 14 of the control thermostat 11 by the displacement provided through the lanced portion 86. Under such conditioning, the lower end of blade 10 engages the button 96 on the compensator 88, and the control cam surface 4 acts as a fulcrum permitting compensation intelligence to be transmitted to the top of blade 10. When the contacts separate as during cyclic heating and cooling of the thermomotive member 11 the blade 10, under the light bias and positioning effect of mounting member 85, bears against the control cam surface 4 and compensator button 96. The compensator 88 is provided to keep the wattage input to the heating unit, as selected by the user, substantially constant regardless of variation in the ambient temperature in the vicinity of the control switch. Thus an increase in temperature will result in movement of button 96 toward the right, as viewed in Fig. 16, the compensator being disposed with its high expansion side facing the rear of the switch case.

"On-off" blade 16 and pilot light blade 21

Figure 19:
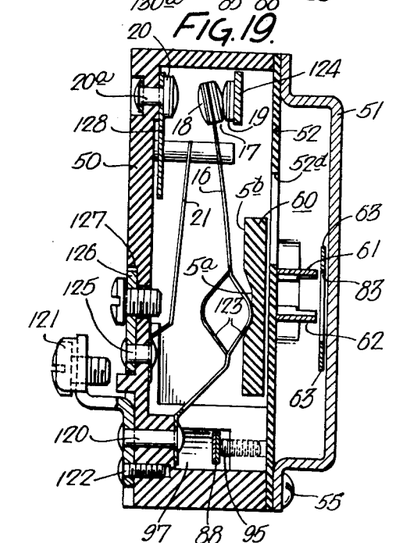

The "on-off" blade 16, shown in Fig. 19, is preferably of silicon bearing copper alloy selected for its high conductivity and excellent spring properties, as in the case of member 85. It is fixed to the control case 50 by a rivet 120 which extends therethrough connecting to a terminal member 121 which is restrained from rotative movement by a drive screw 122. The blade 16 has welded to its free end contacts 17 and 18 which are preferably of fine silver having a steel backing for projection welding to the blade, and the blade is lanced at 123 to provide a cam engagement portion. In Fig. 19, the lanced portion bears against the bottom of a recess 5a which constitutes the "off" portion of camming surface 5. In this position contact 17 engages the stationary contact 19 welded to a bus member 124, and a substantial spacing is shown to exist between the shank of blade 16 and the end of flexible blade 21 which is mounted directly below said switch blade. This pilot blade, also of copper-silicon alloy, is shorter than blade 16 and is mounted to the switch case by a rivet 125 which extends therethrough and connects to a terminal strip 126 nestled in a recess 127 in the back of the switch case.

When the control cam is moved to any of its "on" positions, i. e., any of the infinite number of angular positions of the control cam from its highest to its lowest setting, a surface 5b of control cam surface 5 provides an equal and discrete displacement to the lanced portion 123 of blade 16. This forces contact 18 into engagement with stationary contact 20 which has a body portion 20a for holding itself and a bus member 128 onto the control case when the end of said portion is riveted over. The bus member 128 (Figs. 11 and 18) extends laterally and downwardly at the inside back of the case and connects at its opposite end to the lower end of the blade 22 by means of a rivet member 129 which holds both fast to the case. In the "on'" position the blade 16 engages the top edge of pilot blade 21. The line contact across the top edge of blade 21 and the shank of blade 16 is adequate for carrying the small wattage used in the pilot light circuit.

Blades 22 and 25 and latch control thereof

Figure 17:
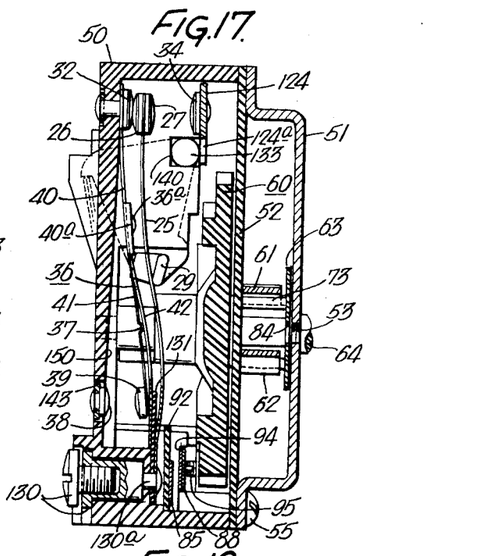
Figure 18:
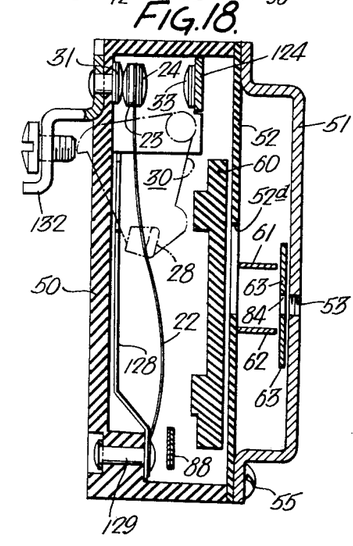

Blade 22 fixed at 129 and blade 25 (Fig. 17), the latter fixed to the control case by terminal member 130 below barrier 92, constitute the two latch controlled blades. These members are normally biased toward the front of the switch case where they engage the stationary contacts 33 and 34 mounted on bus member 124, but when latch restrained as shown in Figs. 17 and 18, they engage the stationary contacts 31 and 32. The terminal member 130 extends from the outside rear of the case, being provided with an extension 130a for being riveted over the base of blade 25 and for holding a flat barrier member 131 of insulating material in position. The blades are of silicon-copper alloy having steel-backed fine silver contacts 23, 24 and 26, 27 welded to the free ends thereof. The stationary contact 31 acts as a rivet member connecting to a terminal member 132 on the outside rear of the switch, while the stationary contact 32 also acts as a rivet member to hold the switch member 36 fixed to the inside rear of the control case 50.

Figure 15:
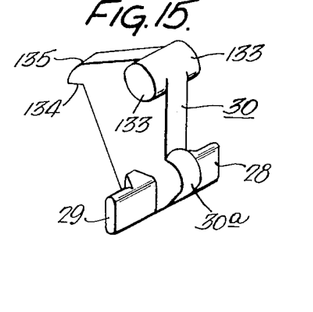
Fig. 15 is an isometric view of the latch member.

The latch member 30, as shown in Fig. 15, is molded from a phenol condensation product, as in the case of the control cam 60 or the switch case 50, and comprises the extension arms 28 and 29 which manipulate blades 22 and 25 respectively, the spherically-shaped cam engaging portion 30a, cylindrical projections 133 which comprise the pivotal mounting members, a prop engaging portion 134 and an arcuate portion 135 adjacent thereto. The cam engaging portion 30a is manipulated through the cam projection 6a (Fig. 20) having sloped sides 6b which constitute the working surfaces of the control cam surfaces 6. The recessed surface 6c of said cam surface is non-critical and is arranged so that latch 30 and blades 22 and 25 can travel unrestrained into engagement with contacts 33 and 34 at termination of flash.

The latch member 30 is located in a rectangular slot 136 (see Figs. 11, 12 and 17) in the switch case having side walls 137 and 138 which prevent the latch from excessive lateral play and contain the square recesses 139 and 140 which serve as journals for the cylindrical projections 133 of said latch. The pivotal connection is completed by an extension 124a on the bus member 124 which was mentioned hereinbefore as having stationary contacts 19, 33 and 34 fixed thereto. This bus member is fixed onto the switch case by riveting over the end of a terminal member 141 which extends from the outside rear of said case. In its latch-in position or in the "off" position, the latch-engaging portion 134 projects beyond the rear of the switch case having the arcuate portion 135 extending over the end of the prop 35. When the control knob 9 is turned from the "off" position, the projection 6a on camming surface 6 rotates latch 30 about pivot 133 causing arcuate surface 135 to slide over the surface of the prop 35 until the surface 134 is reached, at which time the prop 35 falls into position under said surface. It should be noted that the prop 35 is not normally used to hold the latch in latched-in position when the control knob 9 is at its "off" position, it being prop-held only after rotation of projection 6a out of the way of spherical surface 30a.

Figure 13:
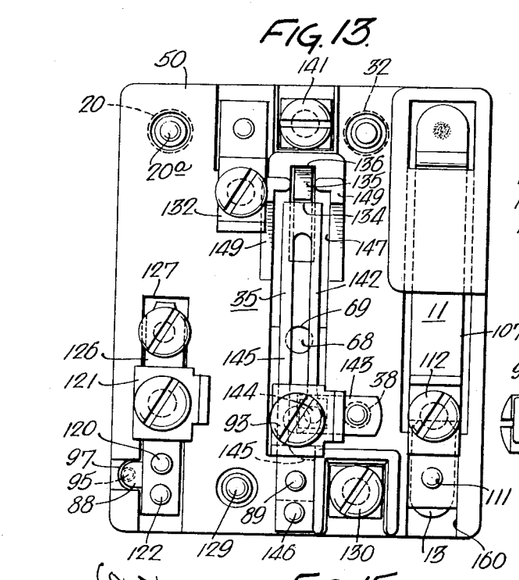
Fig. 13 is a rear view of the switch case.

The prop 35 (Figs. 7, 12 and 13) is stamped from a bimetallic material having a high resistance high activity characteristic and is fixed to the rear of the switch case with its high expansion side facing the case. As mentioned previously, the prop is U-shaped having a leg 142 rigidly fastened under a rectangular bus member 143 by means of a rivet 144 and a longer leg 145 similarly fastened under the terminal member 93, being held by the rivet 89 and a drive screw 146. The base of each of the legs is enlarged to provide ample electrical contact with the terminal and bus members and for mechanical reasons.

The control case is recessed at 147 to receive the prop 35 and is further provided with a ramp formation at 148 which acts to prestress the bimetal sufficiently for it to be non-critical to ambient changes, and in addition acts to increase the inherent strength of the bimetal during warpage. During the self-heating period, the prop finds itself under a compression load from the bias of the blades 22 and 25 and a tangential load due to friction forces at the latch surface 134. The ramp formation 148, however, tends to increase the stability of the prop by increasing its inherent resistance to buckling, and in addition changes the effective cantilever length of the prop thus increasing the inherent strength of the bimetal or its force output at the particular deflection.

The control case has formed therein projections 149 to protect the latch 30 and prop 35, the height of the projections being sufficient to extend beyond the end of the prop 35 when heated by the steady-state "high" heat current under normal energization.

Figure 23:
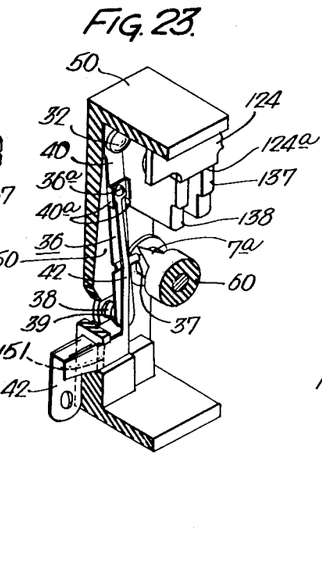
Fig. 23 is an isometric view of the compartment of the switch as shown in Fig. 17.

Switch member 36 (Figs. 17 and 23)

The switch member 36 is shown disposed below blade 25 in the same compartment therewith, being fixed below contact 32 adjacent the free end of blade 25. The portion 40 at the fixed end of said member is made from a thin sheet of high-resistance, high-activity bimetallic material arranged with its high expansion side facing downward. The free end of said bimetallic portion is provided with flanges 40a for accurately positioning the end of the inactive portion 41 and the flexible connector 42, a rivet and washer 36a being used for the securing means. The inactive portion 41 is preferably made of silicon copper alloy having an extension 37 formed as a semi-cylindrical raised portion midway along the length thereof and a contact 39 riveted at its free end. The extension 37 cooperates with a projection 7a on control cam surface 7 for forcing contact 39 into engagement with the stationary contact 38 when the control knob 9 is turned to the "high" heat position. At any other position of the control knob 9 the control cam race 7 does not force contact 39 into engagement with contact 38, but rather engagement is made by the self-flexing of the bimetallic portion 40 by current passing therethrough. When it is neither forced nor flexed by self-heating, the member 36 is biased against barrier 131.

It should be noted that the rear of the switch case below the switch member 36 is sloped as at 150 to provide sufficient electrical clearance between the contacts 38 and 39 (during "off" conditioning of the control knob 9) while the contact member 38 is mounted at the end of the short terminal member 143 in an opening in the rear of the control case.

The flexible conductor 42, formed in the flat as a generally U-shaped member from fine silver, extends along the length of portion 41 and laterally between the compartments that house the switch member 36 and thermomotive member 11 and is bent down in back of the bimetal 12 of said thermomotive member 11. The lateral portion of said conductor is disposed behind barrier 131 and into a groove 151 formed in the partition between the compartments. From this position the conductor is bent back over the top of a ledge 152 formed in the case and thence after another bend down in back of the bimetal 12 as mentioned above.

As disclosed thus far the preferred circuit (Figs. 1 to 5) incorporates an arrangement whereby 100% input is provided by an auxiliary arrangement rather than through the main control contacts 14 and 15. It is, however, entirely feasible for the control device to be built without the additional cam surface 7 and projection 37 on the switch member 36 and thus permit the "high" heat position to be provided by energization through the main control contacts 14 and 15. The remaining functions as would be necessary during flash would be the same as hereinbefore described under "Heats less than 'High'." Such a modification is shown schematically in Fig. 24.

Figure 24:
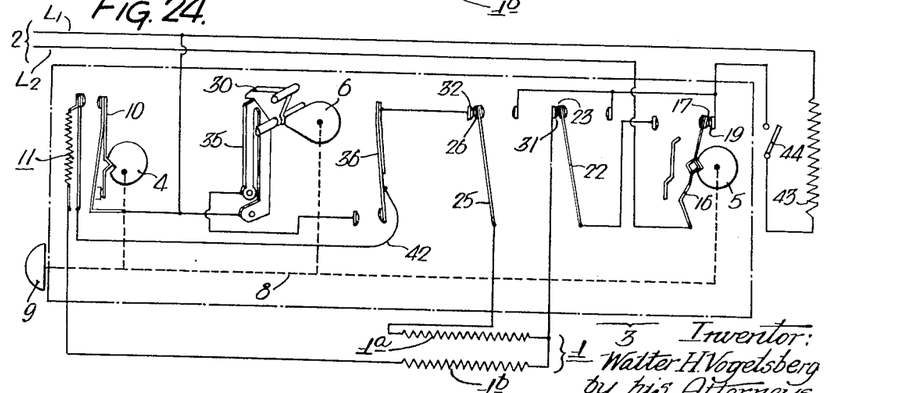
Fig. 24 is a schematic view illustrating a modification of the apparatus.

In an arrangement wherein the main control contacts 14 and 15 are used to obtain 100% input, it is necessary to design the thermostat so that (a) the contacts open to terminate the flash interval, (b) subsequently upon cooling of the thermomotive member 11 the contacts are allowed to make to provide normal current through the heating unit, and (c) the normal current established through the heater 13 is insufficient to cause the contacts to open. In practice it was found necessary in the "high" heat position to provide the adjustable blade 10 with a displacement that would require the thermomotive member 11 to receive an equivalent of 115% of a continuously applied normal energization rate before the contacts could possibly open. This allows for wear on the contacts which would otherwise be evident as a loss in calibration, insures proper energization at the "high" input, and correct length of flash interval.

In the preferred arrangement as shown in Figs. 1 to 5, current by-passes the control contacts 14 and 15 flowing through the heater 13, the bimetal 12, the flexible connector 42, the switch member 36, and the bimetal prop 35 to the supply line. The thermomotive member 11 is now designed so that the contacts break at a position equivalent to a position that said member would assume if it were energized continuously at approximately 85% of full normal wattage. The flash time is of course arranged to be kept the same as with 100% energization through the main control contacts, for it is specified by the heating unit characteristics.

A study of the thermostat characteristics shows that this preferred circuit arrangement permits more thermal mass to be associated with the control bimetal, thus lengthening the total time for a complete "on-off" cycle when the thermomotive member 11 and adjustable blade 10 act as a wattage controller during normal operation (as discussed in my above-mentioned Patent No. 2,623,137.

By using bimetallic prop 35 in the circuit that bypasses contacts 14 and 15 it is possible to keep said bimetal sufficiently flexed throughout the conditioning of the switch in the "high" position that any attempt at reflashes is usually avoided. A reflash is an attempt to reenergize the heating unit at the high wattage of flash. Dangerous reflashes are normally prevented by the "history" heater effect of the thermomotive member as discussed in the aforementioned Patents Nos. 2,207,634 and 2,648,755. If a reflash is attempted by going from "high" position to "off" position and back to "high" position, insufficient time will have elapsed for said prop to cool and to hold the blades 22 and 25 in the latched position. Even if the bimetallic prop is permitted to cool, the thermomotive member 11 will not have had sufficient time to cause engagement of the control contacts 14 and 15. Approximately a full minute must elapse before flash can be reinstituted; thus reflashing which was not prevented by the continuously heated bimetallic prop will be delayed a time sufficient for the heating unit to be cooled below some safe maximum value.

If the operator turns the control knob from the "high" position through the off position to the "simmer" position the fact that the bimetallic prop prevents the resetting of a flash is of particular advantage. In the older designs there would be a prolonged dropping of subsequent load 43 before the thermomotive member would cool to permit the control contacts to make for the first time to reinstitute flash.

It should be noted that the heater 13 is energized at the same rate as section 1b of the heating unit whether on flash or during normal energization and whether or not the main control contacts 14 and 15 are used for 100% energization. This insures this "history" heater effect under all possible conditions.

It is also possible to obtain a certain breadth in the design of the thermomotive member by controlling the resistance of the control bimetal 12. Thus by increasing the resistance the flash time can be shortened without affecting the cyclic operation of the thermostat during "normal" energization. This results from the fact that during "flash" (see Fig. 4) one path for the current is through bimetal 12, and thence through the flexible connector 42 to the heating unit, while during run, (See Fig. 5), (at positions other than high) current is not established through said bimetal.

By way of summary it should be mentioned that the switch member 36 in its circuit arrangement is considered to constitute a particularly novel application. In the "off" position of the control circuit it helps provide disconnect for the heating unit; at the inception of flash it acts to place the self-heating bimetallic prop across the main control contacts; during normal energization of the heating unit it acts to disconnect the bimetal prop from the main control contacts 14 and 15 without any mechanical manipulation from the latch member 30, while during "high" heat energization, by cooperating with the control cam it acts to place the heating unit directly across the supply line instead of across the main control contacts.

By way of specific example the following data is given with respect to an existing physical embodiment of the invention.

The main control bimetal 12 is of .030" material having a high expansion side of 72% manganese, 18% copper and 10% nickel, a low expansion side of Invar, and a nickel layer between the high and low expansion side to increase the conductivity of the strip as a whole.

The heater 13 is of .005" material having an 80% nickel, 20% chromium content. The effective length of the necked-down portion, which institutes the major amount of the heating effect, measures 1 and 13/32" with a width of .096".

The compensating bimetal 88 is of .022" material having a high expansion side of 72% manganese, 18% copper and 10% nickel, with a low expansion side of Invar. Its width at the widest point is .340" with an effective length of approximately 1⅞", with a fulcrum at the widest point being located about 1 1/16" from the center of the insulating button 96.

The bimetallic material for prop 35 is chosen from .025" stock of the same composition as the compensating bimetal 88. The width of the prop legs is 1/16" each.

The bimetallic material used for the active portion 40 of switch member 36 is similar to that used for prop member 35 and compensator 88. The thickness of material used is .005" having a total length of approximately 1 inch with an effective length of approximately 11/32" and .191" width.

During the period of overenergization each section of the heating unit 1 draws approximately 10 amperes, the total current of 20 amperes being carried by the main contacts 14 and 15. The current passing through the flexible connection 42 during this period is 10 amperes and this constitutes the actuating current for the active portion 40 of switch member 36. Once the switch member moves to close contacts 38 and 39 the bimetallic prop 35 is placed in shunt across the main control contacts 14 and 15, receiving only a negligible amount of current until said main contacts are opened at the end of the period of overenergization. At this instant, 10 amperes of current flows through flexible connection 42 from one section of the heating unit, and 10 amperes of current flows through the switch member 36 from the other section of the heating unit, thus passing a total of 20 amperes through the bimetallic prop 35.

During normal operation of the heating unit in high heat position, a total of approximately 5 amperes flows through the sections of the heating unit in series, through the heater 13, the connector 42, and the bimetallic prop 35. During normal energization at inputs less than 100%, 5 amperes will flow through the sections of the heating unit in series and through the heater 13 and the contacts 14 and 15.

It is to be understood that many changes could be made in the above construction and circuit arrangement without departing from the scope of this invention.

I claim:

1. In a switch device for the purpose described, a switch casing or housing, a plurality of switches arranged side-by-side in said casing and comprising spring blades, a pivoted latch member within said casing cooperatively associated with some of said blades and operable to move the blades, said latch member having a portion extending to the outside of said casing, a manually-rotatable cam-faced member arranged in confronting relation to said switches and said latch member and having concentric cam races for actuating said latch member and also the blades which are not controlled by said member, and a current-operable thermomotive element on the outside of said casing cooperatively associated with said portion of said latch member to restrain the same in latching position.

2. In a switch device for use in a system for effecting overenergization and subsequent normal operation of an electrical heating unit, a casing having partitions therein dividing the casing into four side-by-side compartments or recesses, a thermostatic control switch disposed in one of the outer compartments, switch means disposed in the two intermediate compartments for effecting overenergization or normal operation of the heating unit, an on-off switch disposed in the other outer compartment, a latch member arranged to actuate said switch means, and a manually-rotatable cam-faced member arranged in confronting relation to said switches and said latch member, and having cam races for actuating said switches and said latch member.

3. In a switch device for use in a system for effecting overenergization and subsequent normal operation of an electrical heating unit, a manually-rotatable control member disposed substantially centrally of said device and having concentric cam races, an adjustable thermostatic control switch arranged for adjustment by the outermost cam race of said member, switch means, a latch member pivotally mounted to the casing of said device for actuating said switch means and arranged for operation by an inner cam race of said control member, and a latch holding element mounted to said casing and engageable with said latch member to hold the same in latched position.

4. In a switch device for the purpose described, a casing formed to provide a plurality of compartments or recesses, a pair of spaced movable switch blades in adjacent compartments, two sets of stationary contacts between which said blades are movable, latch means including a member engageable with said blades to control the position thereof, a third movable switch blade in another adjacent compartment, two stationary contacts between which the latter blade is movable, a manually-operable cam for controlling the position of said third blade and for moving said latch member to its latched position when said cam is in one of its positions, and a single bus member arranged cooperatively with said switch blades and having thereon one set of the first-mentioned contacts and one of the last-mentioned contacts.

5 In a switch device for the purpose described, a switch casing or housing, a plurality of switches arranged side-by-side in said casing and comprising spring blades, a pivoted latch member within said casing cooperatively associated with some of said blades and operable to move the blades, a manually-rotatable cam-faced member arranged in confronting relation to said switches and said latch member and having concentric cam races for actuating said latch member and also the blades which are not controlled by said member, and a current-operable thermomotive element cooperatively associated with said latch member to restrain the same in latching position.

6. In a switch device for use in a system for effecting overenergization and subsequent normal operation of an electrical heating unit, a switch casing or housing, a thermostatic control switch in said casing, switch means in said casing, in side-by-side relation with said control switch, for effecting overenergization or normal operation of the heating unit, a latch member arranged to actuate said switch means, a manually-rotatable cam-faced member arranged in confronting relation to said control switch and said latch member, and having cam races for actuating said switch and said latch member, and a current-operable thermomotive element cooperatively associated with said latch member to restrain the same in latching position.

7. In a switch device for the purpose described, a switch casing, a manually rotatable cam member within said casing having concentric cam portions including an innermost cam portion and an adjacent cam portion, a first switch means in said casing including a switch blade, a pivoted latch member engageable by the last-named cam portion for actuation thereby and engaging said blade to actuate the same, a latch holding element engageable with said latch member to hold the same in latched position, and a second switch means in said casing including a switch blade disposed behind the switch blade of said first switch means and operable by said innermost cam portion.

References Cited in the file of this patent

UNITED STATES PATENTS

| Number | Name | Date |
|---|---|---|
| 1,728,794 | Gates | Sept. 17, 1929 |
| 2,020,332 | Sachs | Nov. 12, 1935 |
| 2,186,342 | Pengilly et al. | Jan. 9, 1940 |
| 2,261,139 | Burnside | Nov. 4, 1941 |
| 2,343,612 | Frank et al. | Mar. 7, 1944 |
| 2,357,151 | Von Hoorn | Aug. 29, 1944 |
| 2,388,702 | Pearce | Nov. 13, 1945 |
| 2,389,999 | Rypinski | Nov. 27, 1945 |
| 2,496,072 | Taylor | Jan. 31, 1950 |
| 2,554,535 | Long et al. | May 29, 1951 |
| 2,555,035 | Hermann et al. | May 29, 1951 |
| 2,607,868 | Platz | Aug. 19, 1952 |
| 2,635,640 | Nellis | Apr. 21, 1953 |